June 17, 1941. C. M. F. FRIDEN Re. 21,829

CALCULATING MACHINE

Original Filed Feb. 6, 1928 11 Sheets-Sheet 1

Carl M. F. Friden
Inventor

Lyon & Lyon
Attys.

June 17, 1941. C. M. F. FRIDEN Re. 21,829

CALCULATING MACHINE

Original Filed Feb. 6, 1928 11 Sheets-Sheet 2

Carl M. F. Friden
Inventor
Lyon & Lyon
Attorneys

June 17, 1941. C. M. F. FRIDEN Re. 21,829
CALCULATING MACHINE
Original Filed Feb. 6, 1928 11 Sheets-Sheet 3
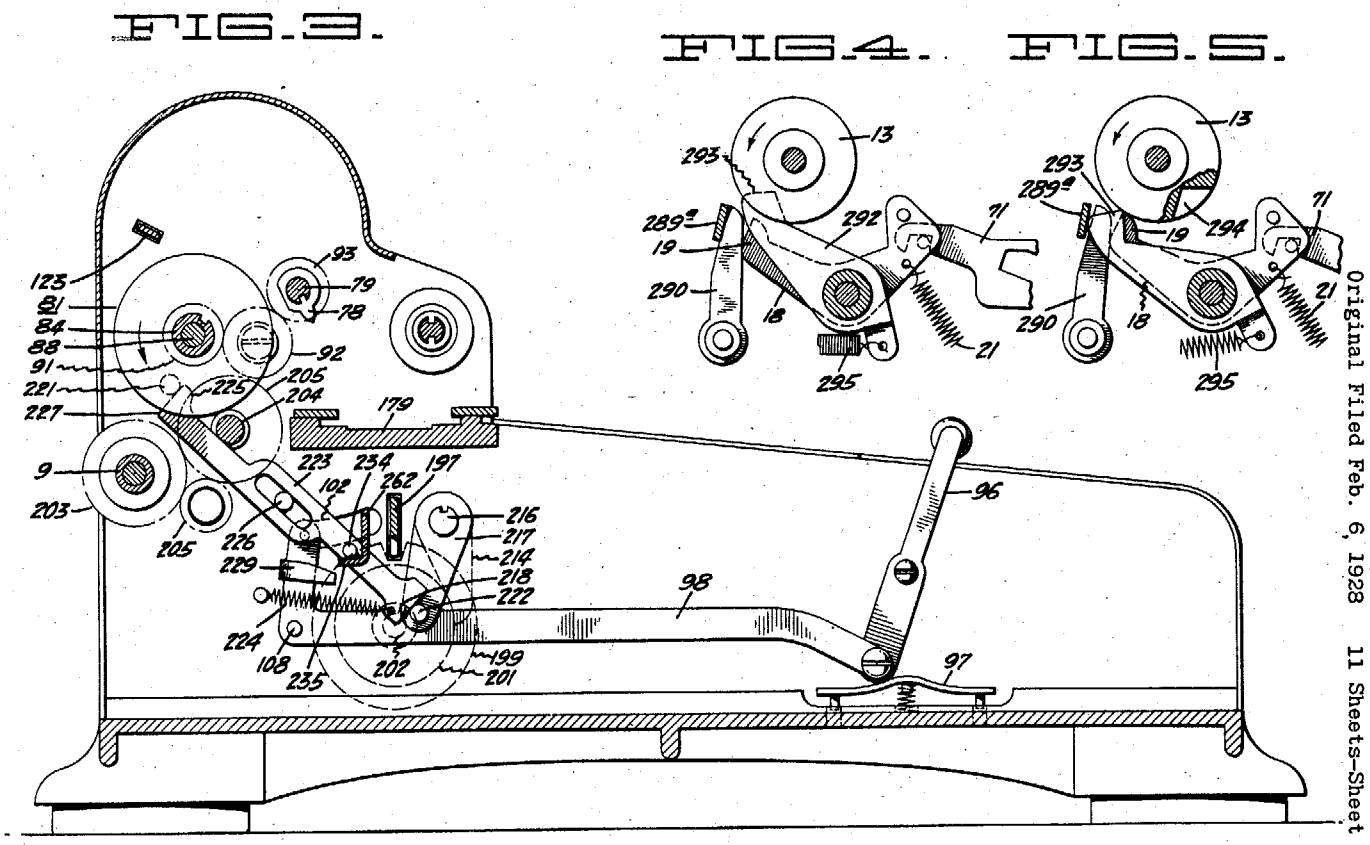
Carl M. F. Friden
Inventor
Lyon & Lyon
Attorneys June 17, 1941. C. M. F. FRIDEN Re. 21,829
CALCULATING MACHINE
Original Filed Feb. 6, 1928 11 Sheets-Sheet 4
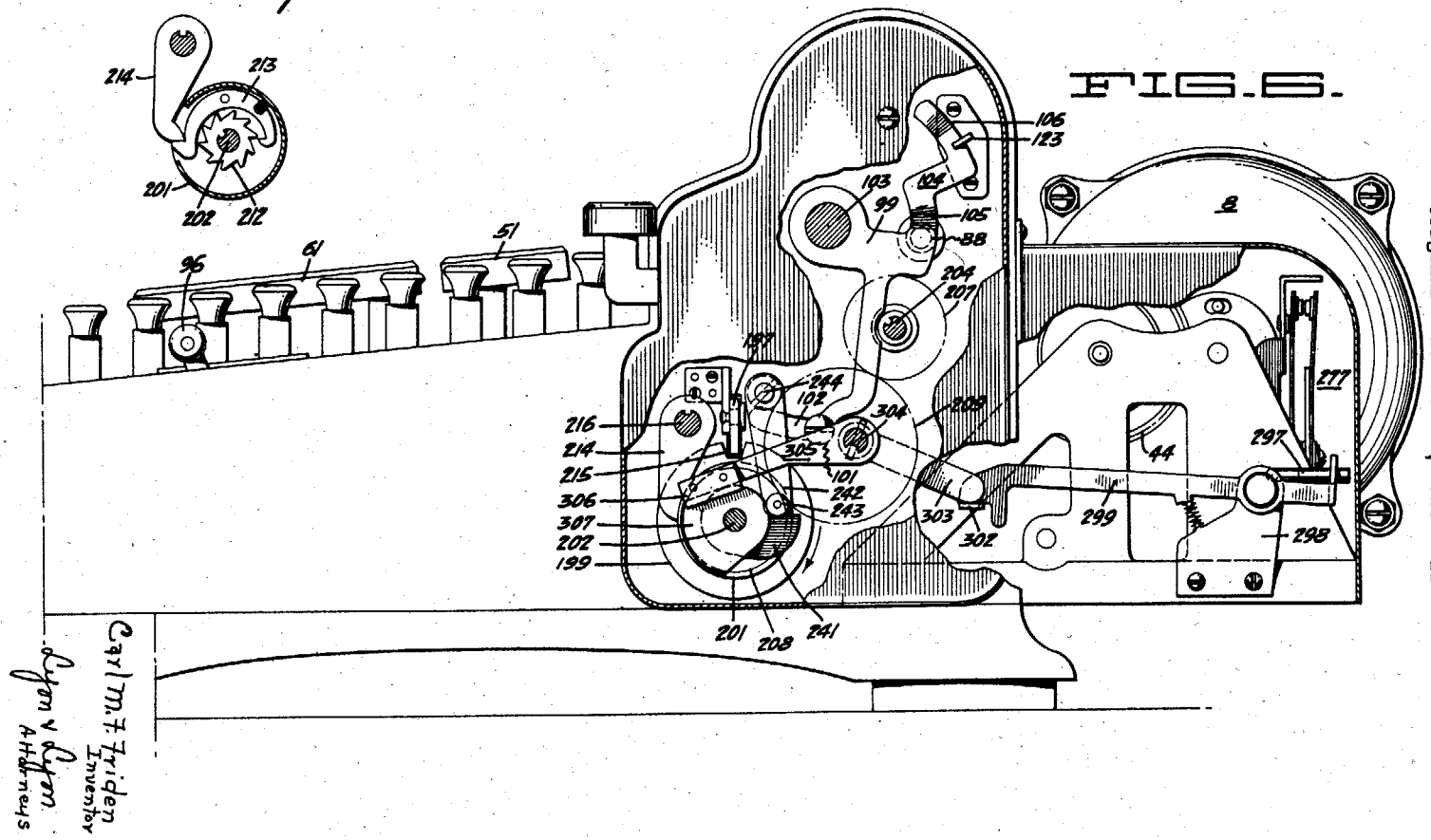

June 17, 1941. C. M. F. FRIDEN Re. 21,829
CALCULATING MACHINE
Original Filed Feb. 6, 1928 11 Sheets-Sheet 5
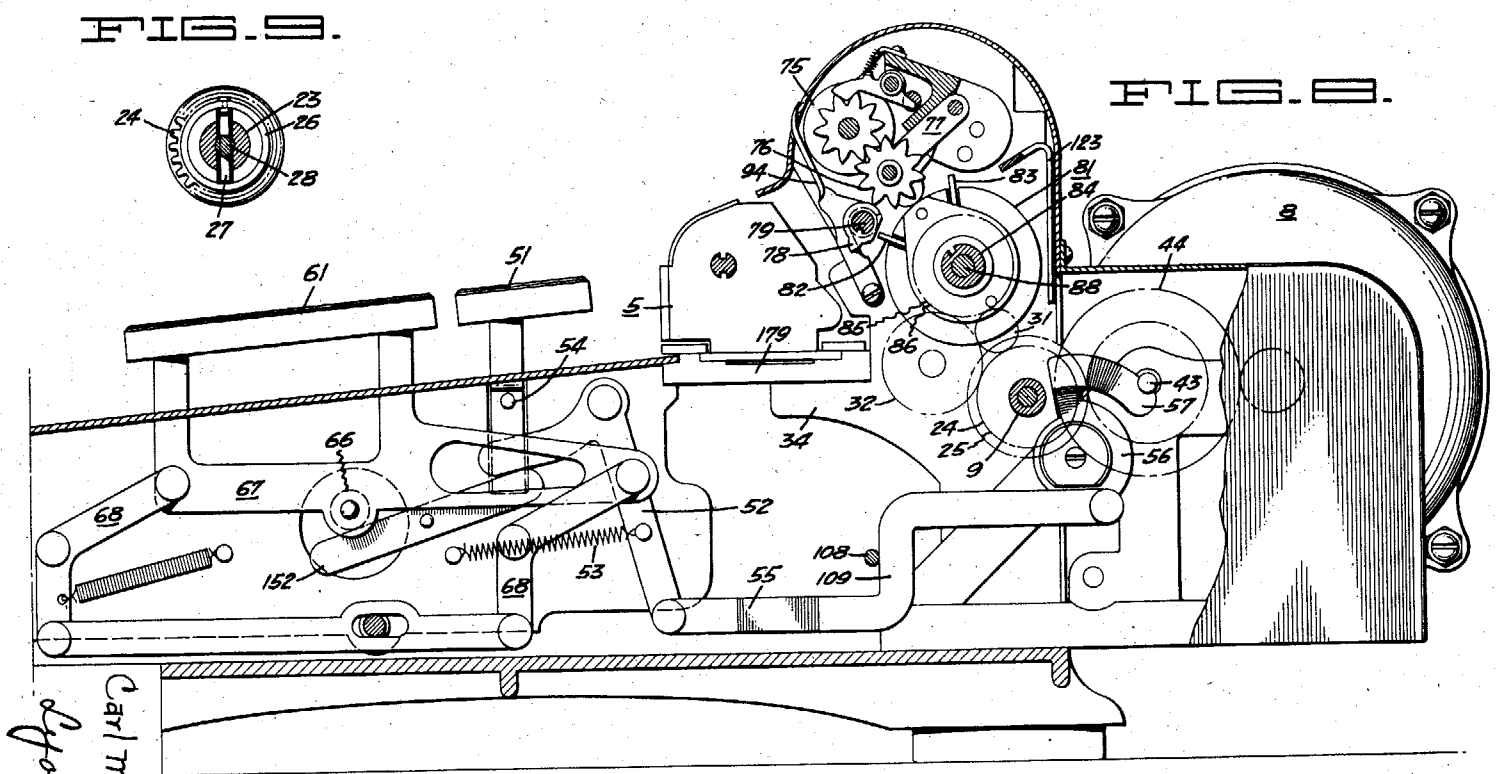

June 17, 1941. C. M. F. FRIDEN Re. 21,829

CALCULATING MACHINE

Original Filed Feb. 6, 1928 11 Sheets-Sheet 6

Carl M. F. Friden
Inventor

Lyon & Lyon
Attorneys

June 17, 1941. C. M. F. FRIDEN Re. 21,829

CALCULATING MACHINE

Original Filed Feb. 6, 1928 11 Sheets-Sheet 7

Carl M. F. Friden
Inventor

Lyon & Lyon
Attorneys

June 17, 1941. C. M. F. FRIDEN Re. 21,829

CALCULATING MACHINE

Original Filed Feb. 6, 1928 11 Sheets-Sheet 8

Carl M. F. Friden
Inventor

Lyon & Lyon
Attorneys.

June 17, 1941. C. M. F. FRIDEN Re. 21,829
CALCULATING MACHINE
Original Filed Feb. 6, 1928 11 Sheets-Sheet 9
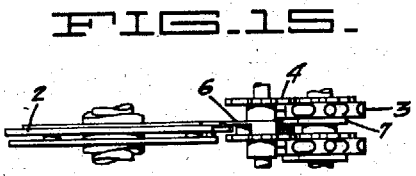
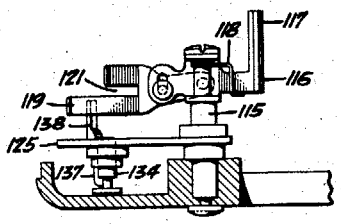
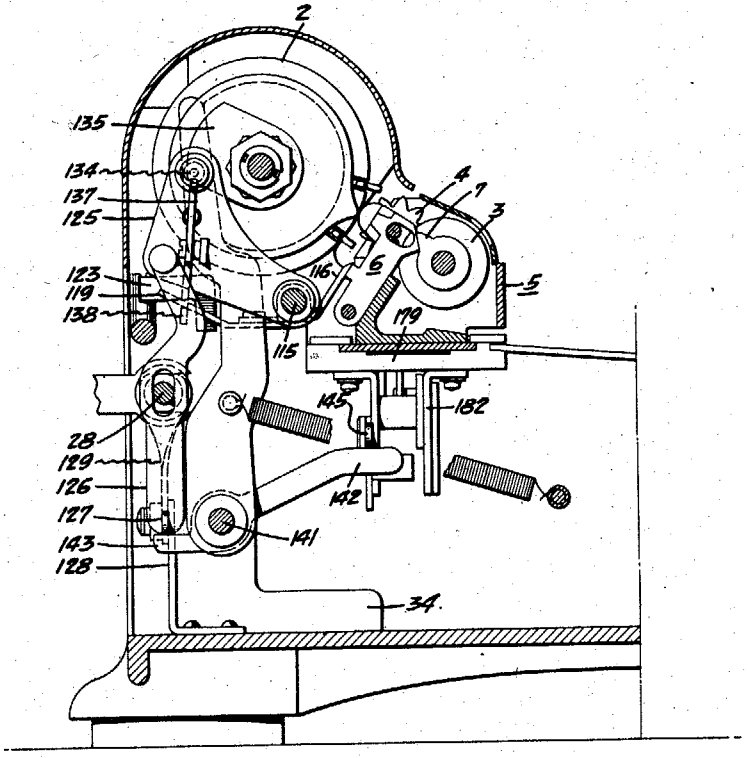
Carl M. F. Friden
Inventor
Lyon & Lyon Attys.

June 17, 1941. C. M. F. FRIDEN Re. 21,829

CALCULATING MACHINE

Original Filed Feb. 6, 1928 11 Sheets-Sheet 10

Carl M. F. Friden
Inventor
Cyan & Cyan Attorneys

June 17, 1941. C. M. F. FRIDEN Re. 21,829
CALCULATING MACHINE
Original Filed Feb. 6, 1928 11 Sheets-Sheet 11
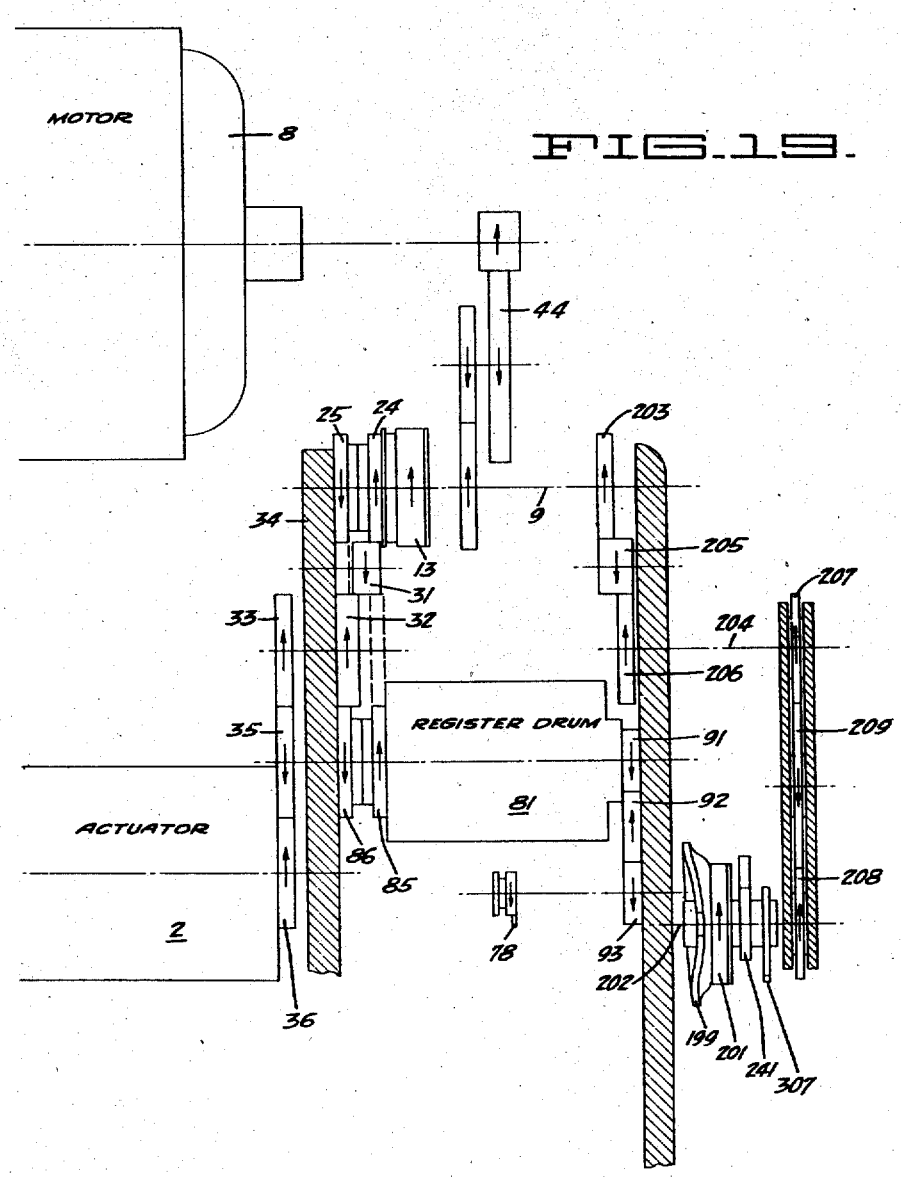
Carl M. F. Friden
Inventor
Lyon & Lyon Attys.

Reissued June 17, 1941

Re. 21,829

UNITED STATES PATENT OFFICE 21,829

CALCULATING MACHINE

Carl M. F. Friden, Pleasanton, Calif., assignor to Marchant Calculating Machine Company, Emeryville, Calif., a corporation of California Original No. 2,142,892, dated January 3, 1939, Serial No. 252,175, February 6, 1928. Renewed February 15, 1938. Application for reissue April 3, 1940, Serial No. 327,732

14 Claims. (Cl. 235—62)

This invention relates to calculating machines of the motor driven type, and particularly to the means for controlling the actuation of the machine in performing problems in the four rule calculations.

The calculating machine comprises a rotary actuator and a plurality of keys for introducing values into the actuator. The depression of a key introduces a value corresponding to the numeral on the key, into the rotatable actuator and rotation of the actuator serves to transfer these values into the counter or register, to effect the calculating operation. The values introduced into the actuator are transmitted, on rotation of the actuator in either direction to the figure discs of the counting mechanism, which, for the purpose of making direct action of the selected values on the figure discs of highest value possible, is disposed in parallel displaceable relation to the axis of the actuator. The counting mechanism comprises a series of numeral wheels which are mounted on a carriage which is displaceable transversely of the calculating machine, with respect to the actuator.

The present invention relates particularly to means for controlling the operation of the machine in the performance of problems in division. These means include devices operative to correct an overdraft registration in one position of the carriage, then shift the carriage, then correct the overdraft registration in the shifted position and so on until the machine is automatically brought to a stop when the carriage has been shifted to its limit position.

An object of the invention is to provide a calculating machine adapted to perform the four rule calculations, with means whereby the machine may be set to perform problems in division only.

Another object of the invention is to provide a calculating machine having means for automatically shifting the carriage, which means is disabled except when the machine is set to perform problems in division.

Another object of the invention is to provide a calculating machine, which when set to perform problems in division, operates on the occasion of an overdraft registration in the numeral wheels, to correct the overdraft, stop the actuator and shift the carriage to the next position, start the actuator again in a subtractive direction until an overdraft occurs, correct the overdraft, again stop the actuator and shift the carriage and continue such operations to disclose the proper, complete quotient figure.

Another object of the invention is to provide a calculating machine, having a driving motor which is normally stopped when the actuator is stopped, with means operative when the machine is set to perform problems in division, for maintaining the motor in continuous operation during the time that the actuator is stopped.

The invention possesses other advantageous features, some of which with the foregoing will be set forth at length in the following description, where I shall outline in full that form of my invention which I have selected for illustration in the drawings accompanying and forming part of the present specification.

In said drawings, I have shown one form of mechanism embodying my invention as it is embodied in a Marchant calculating machine, but it is to be understood that I do not limit myself to such form, since the invention, as set forth in the claims, may be embodied in a plurality of forms.

Referring to said drawings:

Figure 3 is a vertical, longitudinal section through the calculating machine, showing the means for setting the machine for the performance of problems in division.

Figure 4 is a detail showing the motor switch control lever in open switch position, and Figure 5 is a similar view showing the control lever in closed switch position.

Figure 6 is a vertical, longitudinal section through the calculating machine showing a portion of the setting mechanism for setting the machine for the performance of problems in division and the clutch for controlling the shifting of the carriage.

Figure 7 is a detail of the carriage shifting control clutch.

Figure 8 is a longitudinal, vertical section through a calculating machine embodying my invention, showing the positive and negative operation keys, the quotient register and the means for operating such register.

Figure 9 is a detail of the reversing mechanism interposed between the motor and the actuator.

Figure 14 is a vertical, longitudinal section through the rear portion of the machine, showing the actuator, the register, and the means operated by a transitional carry of one of the numeral wheels of the register to reverse the direction of rotation of the actuator.

Figure 15 is a detail of one unit of the actuator in association with two numeral wheels of the register.

Figure 16 is a detail showing the means actuated by a transitional carry of the numeral wheels to control the reversal of the actuator.

Figure 19 is a diagrammatic representation of the drive for the various elements of the calculating machine.

Figure 1:
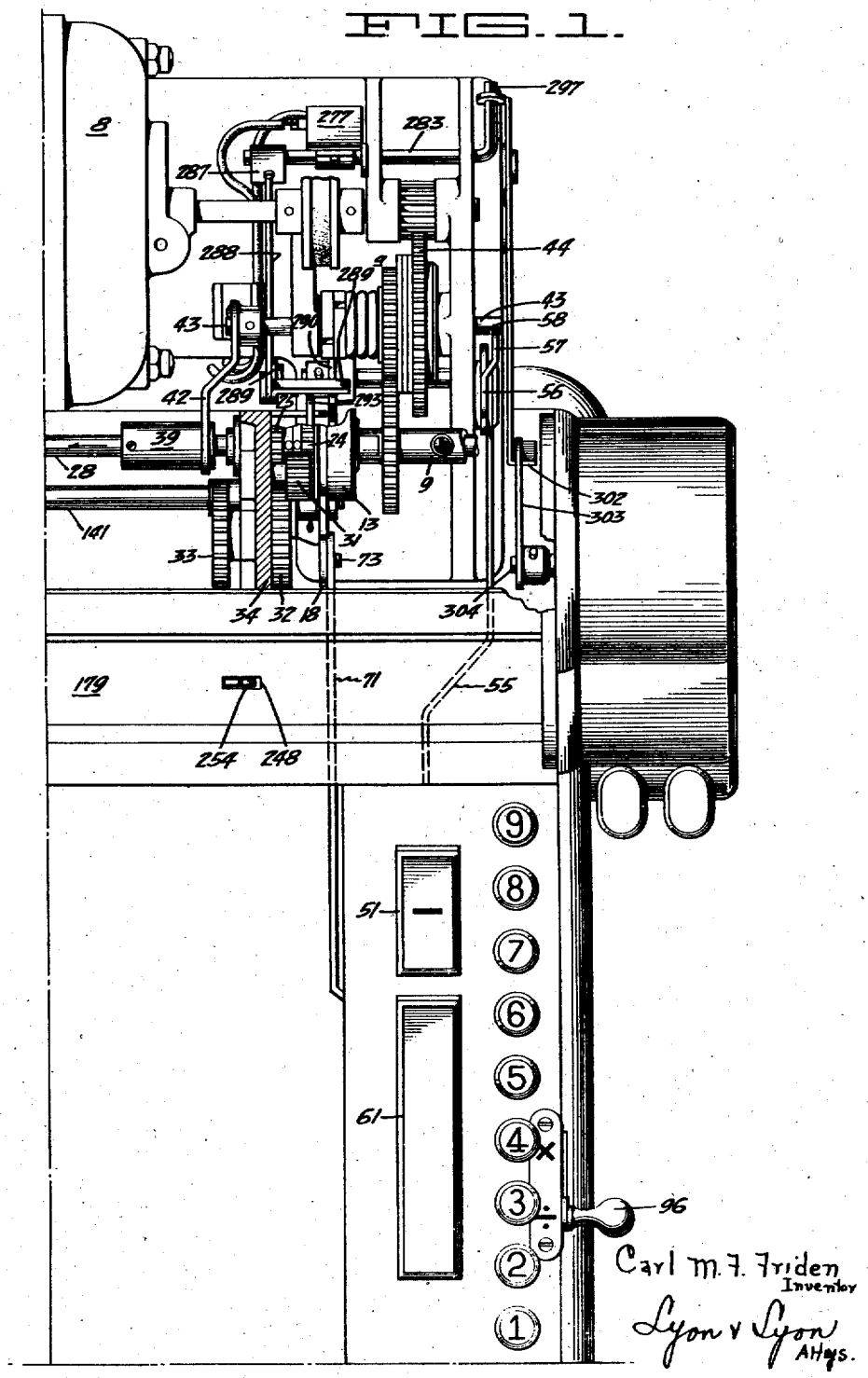
Figure 1 is a top or plan view of a portion of a calculating machine embodying my invention, the casing being removed and several parts being shown in section, to better illustrate the construction.

The invention relates to motor driven calculating machines and particularly to the control mechanism for controlling the operation of the actuating means and the motor and the movement of the carriage. The machine is provided with positive and negative operation keys, depression of the positive key serving to cause rotation of the actuator in an additive direction and depression of the negative key serving to cause rotation of the actuator in a subtractive direction. The positive key is used primarily in performing problems in addition and multiplication and the negative key is used primarily for performing problems in subtraction and division, although in short cut multiplication, the negative key is also employed. The present invention concerns itself chiefly with providing means for accomplishing the automatic solution of a problem in division. In such problems, the negative operation key is employed, and means are provided for locking the positive operation key against action, when the machine is set to perform problems in division, so that the operator may not make an error. The negative operation key is associated with means which are effective only when the machine is set to perform problems in division, for automatically reversing the direction of rotation of the actuator upon an overdraft registration of the numeral wheels, to stop the actuator at the end of one cycle of such reversed movement, so that the quotient register will show the true quotient figure, to shift the carriage to its next position, to again rotate the actuator in a subtractive direction until an overdraft registration occurs, to then automatically reverse the direction of rotation of the actuator, to stop the actuator at the end of one cycle of such reversed movement, to shift the carriage to its next position and to continue this operation, until the carriage reaches the limit of its movement, at which time the machine is stopped at the true quotient figure produced.

The present machine includes a suitable frame, within which the various instrumentalities of the calculating machine are arranged. Many of these instrumentalities, including the specific construction of the actuator, the connections between the numeral keys and the actuator, the automatic multiplication mechanism and other features of the machine are fully disclosed in my United States Patent No. 1,643,710 of September 27, 1927, to which reference is hereby made for a complete disclosure of those features of the calculating machine which are not specifically disclosed in this application. The calculating machines include a reversible, rotary actuator 2 comprising a series of units into which values are introduced by the depression of keys. Each unit is also provided with tens carrying pins for transferring values to the numeral wheels of the counting mechanism of the next highest order. Each unit is provided with two tens carrying pins and the two series of pins on the actuator are arranged in diverging spirals. One series of pins is effective in carrying tens during an additive or forward rotation of the actuator and the other series of pins is effective in carrying tens during a subtractive or reverse rotation of the actuator. The values introduced into the actuator by the depression of keys are transferred, upon rotation of the actuator in either direction, to the numeral wheels 3 of the counting mechanism, or counting register as it is generally known, through the intermediate gears 4. The product register, together with its associated intermediate gears and transfer levers is arranged on a transversely movable carriage 5, which is guided in suitable trackways in the frame, so that the carriage may be moved to establish cooperation between any desired numeral wheel and any desired unit of the actuating means, within the limits of movement of the carriage. Associated with each counting wheel 3 is a transfer lever 6 which is actuated upon movement of the numeral wheel, forwardly to or reversely from zero position, this movement being referred to as a transitional carry. This movement of the transfer lever 6 is effected by an associated toothed member 7 secured to the numeral wheel.

Figure 2:
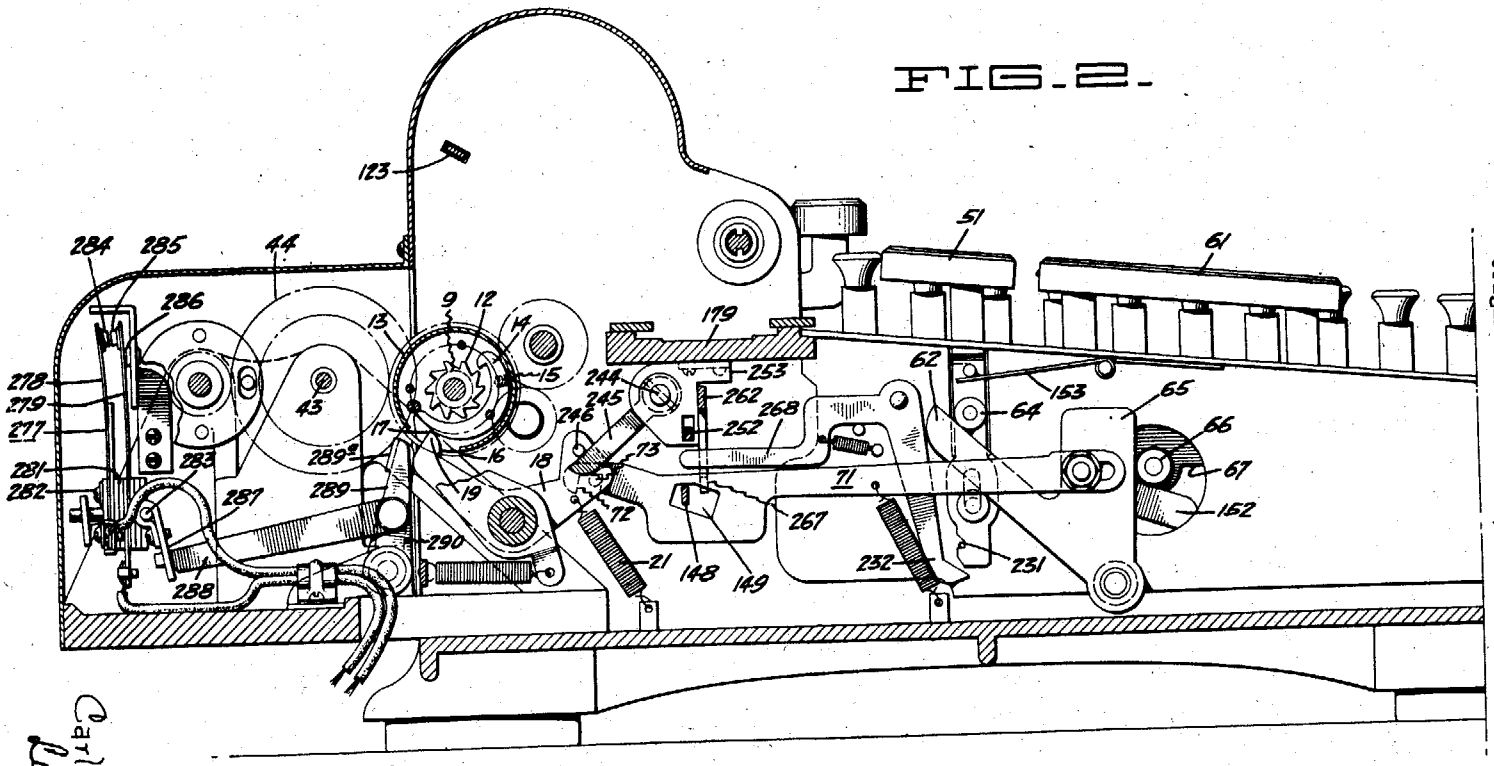
Figure 2 is a vertical, longitudinal section through a calculating machine embodying my invention, showing the positive and negative operation keys and the drive control mechanism which is controlled thereby.

The actuator is driven by the motor 8 and interposed between the motor and the actuator is a clutch for connecting and disconnecting the motor from the actuator, and a reversing mechanism, whereby the direction of rotation of the actuator may be reversed. The clutch, shown in Fig. 2, embodies a driving shaft 9, suitably connected to the motor shaft by means of the speed reduction gearing, as shown in Fig. 1, and the driving shaft is provided on its end with a ratchet pinion 12, which rotates continuously with the motor. The motor is provided with a switch which is closed only during the time that the machine is functioning to perform a problem in calculation. Journalled on the driving shaft 9 and enclosing the ratchet pinion 12 is a clutch housing 13, within which is pivoted a dog 14 which is adapted to be moved into and out of engagement with the ratchet pinion 12, to connect and disconnect the pinion and the housing. The dog or pawl 14 is urged toward engagement with the pinion 12 by the spring 15. The clutch housing 13 is provided on its periphery with an aperture 16 through which a foot 17 on the end of the pawl 14 extends when the pawl is in engagement with the pinion. The pawl is disengaged from the pinion by inward movement of the foot 17 and this is accomplished by means of the clutch control lever 18 which is provided on its end with a foot 19 which, when the lever 18 is released of its restraint is moved into contact with the periphery of the housing 13 by the spring 21, and, as the housing rotates, the foot 19 contacts with the foot 17 and enters the aperture 16, thereby disengaging the clutch and locking the clutch housing. The clutch housing is so positioned with respect to the actuator that when the clutch housing is locked the actuator is locked in full cycle position.

Secured to the clutch housing 13 is a hollow stub shaft 23, which forms part of the reversing gearing. Journalled on the hollow shaft 23 are two gears 24 and 25 either of which may be directly connected to the hollow shaft to rotate therewith. Each of the gears 24 and 25 is provided on its inner periphery with an interrupted flange 26, the two flanges being in contact. The hollow shaft 23 (Fig. 10) is provided with an aperture extending diametrically therethrough and disposed in the aperture is a cross pin 27 which is adapted to seat in the interruption of either of the flanges 26 (Fig. 9). The pin 27 is of less diameter than the depth of the flange so that the pin may seat entirely within either flange. The pin is movable transversely, in the direction of the axis of the shaft 23, to bring it into engagement with either of the gears 24 or 25, and for this purpose the pin 27 is secured to the rod 28 which extends outward from the end of the hollow shaft 23 and is suitably supported at its other end in the frame of the machine. The interruptions in the flanges 26 are somewhat wider than the diameter of the pin 27 to permit the pin to be shifted to reverse the direction of rotation of the actuator without bringing the actuator to a stop. Meshing with the gear 24 is an idler gear 31 which in turn meshes with a gear 32 which is directly in mesh with the gear 25. Therefore, the gear 32 is driven in one direction when the gear 24 is in engagement with the hollow shaft 23 and in the opposite direction when the gear 25 is in engagement with the hollow shaft 23. Secured to the shaft of the gear 32 is a gear 33 lying on the opposite side of the intermediate wall 34 and the gear 33 is connected to the gear 36 on the actuator shaft by the intermediate gear 35. Therefore, shifting of the pin 27 reverses the direction of rotation of the actuator.

Figure 10:
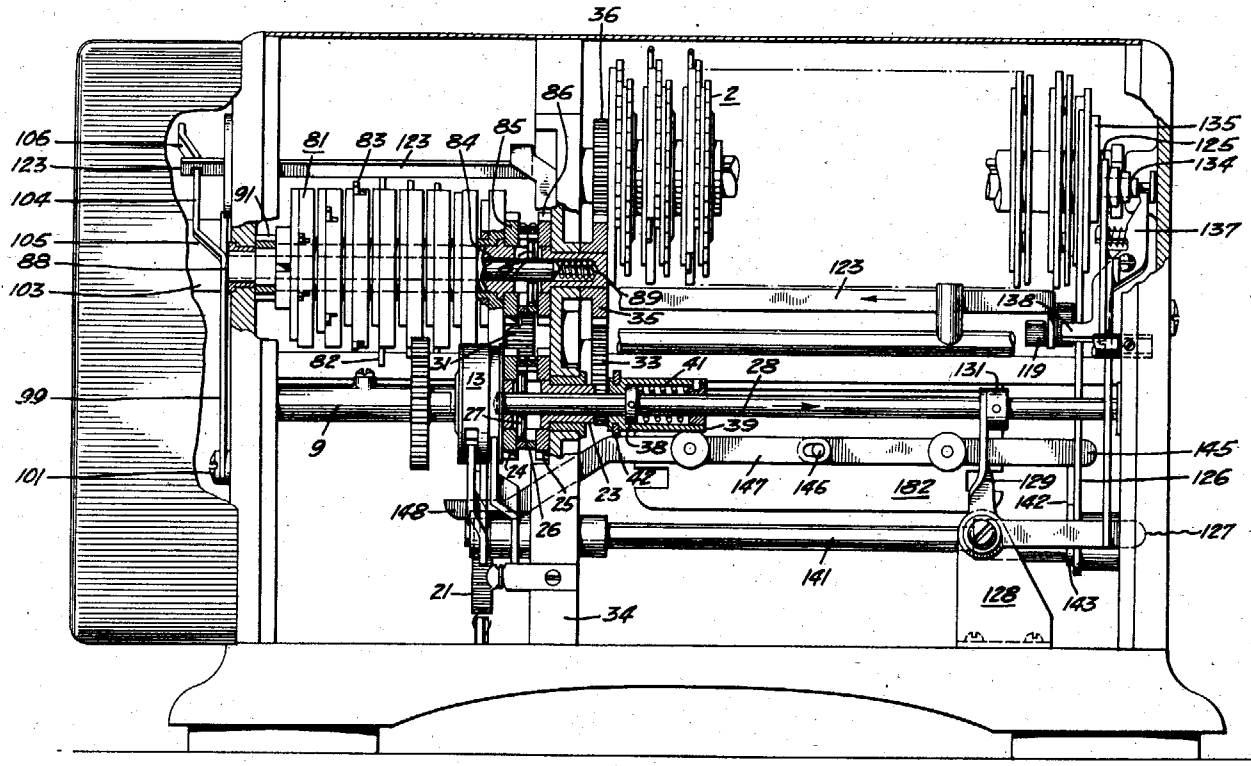
Figure 10 is a rear elevation of a calculating machine, parts thereof being broken away and other parts being shown in section, to illustrate the construction of the machine.

Means are provided for either manually or automatically shifting the pin 27 to reverse the direction of rotation of the actuator. Secured to the shifting rod 28 is a collar 38 which is enclosed by the spring housing 39, between the end of which and the collar 38 there is inserted a compression spring 41 (Fig. 10) which holds the housing tightly against the collar, so that movement of the housing toward the right will effect movement of the rod 28 and permitting movement of the rod 28 to the right without moving the spring housing. In Fig. 10 the pin 27 is shown in engagement with the gear 24, thus producing reverse or subtractive drive of the actuator. Movement of the pin 27 to the right and into engagement with the gear 25 will cause forward rotation of the actuator. Engaging in a circumferential groove in the spring housing 39 is a fork 42 which is attached at its other end to the shifting rod 43 (Fig. 1), which is suitably journalled within the frame of the machine and which extends through the hollow shaft carrying the transmission gear 44. By movement of the shifting rod 43, which is manually operated, the pin 27 may be moved to cause forward or reverse drive of the actuator. The direction of rotation of the actuator may be reversed manually by moving the fork 42 and is reversible automatically by movement of the rod 28. These two means of accomplishing the reversal of rotation of the actuator will be set forth in full hereafter.

Manual operation of the reversing gear is effected by the depression and release of the negative operation key 51, which is preferably arranged on the keyboard of the machine. Pivoted within the machine is a bell crank lever 52 (Fig. 8) which is normally held in restrained position by the spring 53, and when the lever 52 is in such restrained position, the reversing mechanism is in position to cause forward or additive rotation of the actuator. One leg of the bell crank lever 52 underlies a pin 54 on the stem of the negative operation key 51 so that when the key 51 is depressed, the lever 52 is moved against the restraint of the spring 53. The lever 52 is connected by means of the link 55 with a lever 56 having a sector shaped cam 57 which engages in a slot 58 in the projecting end of the rod 43. Depression of the negative operation key 51, therefore, shifts the rod 28 to cause reverse rotation of the actuator. The above described operation occurs when the machine is set to perform problems in addition, multiplication and subtraction. Means are provided for setting the machine to perform problems in division and this setting means is associated with the link 55, so that when the setting means is operated to place the machine in condition to perform problems in division, the link 55 is shifted, shifting the rod 43 to cause reverse rotation of the actuator. The mechanism for accomplishing the setting of the machine for this purpose will be hereinafter described.

The machine is also provided with a positive operation key 61 depression of which causes forward rotation of the actuator. The connection between the motor and the actuator is controlled by the clutch, and the action of the clutch is controlled by the lever 18 which is normally held in clutch disengaging position by the spring 21. Means are provided whereby the depression of either key 51 or key 61 will rock the lever 18 to move it out of engagement with the clutch housing 13 and permit engagement of the clutch. Pivoted within the frame of the machine is a bell crank lever 62 (Fig. 2) underlying a roller 64 on the stem of the negative operation key 51 and having a substantially vertical arm 65 lying in front of a roller 66 carried by the frame 67 of the positive operation key 61. The frame 67 is mounted on levers 68 in such manner that depression of the positive operation key 61 causes forward movement of the roller 66 against the upright portion 65 of the bell crank lever, thereby rocking such lever. It will be seen from Figure 2, therefore, that depression of either key 51 or key 61 will cause counterclockwise rotation of the bell crank lever 62. Pivoted to the arm 65 of the lever 62 is a bar 71 provided on its under side at its rear end with a notch 72 in which a pin 73 on the forward end of the clutch control lever 18 is normally disposed. Therefore, rearward movement of the bar 71 rocks the lever 18 about its pivot to move it out of engagement with the clutch housing. Release of either of the depressed keys 51 or 61 will cause the clutch lever 18 to again move into engagement with the clutch housing and other means are provided independent of the depressed position of the keys 51 and 61 for releasing the lever 18 to cause it to engage the clutch housing. This is accomplished by raising the rear end of the bar 71 to move the notch 72 from engagement with the pin 73 as will be described hereinafter.

The calculating machine is also provided with a register or counting mechanism usually known as the multiplier register or quotient register, for indicating directly the proper and correct multiplier or quotient. This register comprises a series of numeral wheels 75 (Fig. 8) each numeral wheel being provided with an intermediate gear 76 and a transfer lever 77. Means are provided for causing a single operation of a selected numeral wheel for each rotation of the actuator in either direction, and tens carrying means are provided so that the register will always show the correct figure. The numeral wheels 75 are actuated in time with the rotation of the actuator by the rotatable single toothed member 78 which is splined to the shaft 79 which is rotatable in time with the actuator.

The tens carrying device in the particular embodiment shown, comprises a drum 81 having two series of tens carrying pins 82 and 83 thereon, the pins in the two series being arranged in diverging spirals so that they are reversibly operated upon reverse rotation of the drum. The drum is secured to a shaft 84 journalled in the frame of the machine and the tens carrying pins 82 and 83 cooperate with the transfer lever 77 to transfer values to the numeral wheels of the next highest order. Means are provided for reversing the direction of rotation of the actuator. The drum 81 is provided with a reversing gear, similar to that heretofore described herein, and comprising the two gears 85 and 86, either of which may be directly connected to the shaft 84 by the transversely movable pin 87 (Fig. 10) which is secured to the rod 88 which is disposed within the hollow shaft 84. The gear 85 is in mesh with the idler gear 31 and the gear 86 is in mesh with the gear 32. Since the gears 31 and 32 always rotate in opposite directions, the gears 85 and 86 will always rotate in opposite directions and the direction of rotation of the drum 81 is determined by which of the gears 85 or 86 is secured to the shaft thereof. The rod 88 (Fig. 10) extends to the end of the hollow shaft 84 and projects slightly therefrom. The shaft 88 is urged toward the left by the spring 89 disposed in the bore of the hollow shaft and means are provided for exerting a pressure on the end of the rod 88, to move it against the pressure of the spring. When the machine is set to perform problems in division, the parts are in the position shown in Figure 10, with the gear 86 secured to the shaft 84. When the machine is set to perform problems in multiplication and addition, the spring 89 positions the pin 87 in the recess in gear 85, connecting this gear with the hollow shaft 84. Therefore, the direction of rotation of the drum 81 may be reversed with respect to the direction of rotation of the actuator.

Secured to the opposite end of the drum shaft 84 is a gear 91 which is connected, through the intermediate gear 92 (Fig. 3) with the gear 93 secured to the end of the multiplier register actuating shaft 79. Therefore, the direction of rotation of the actuating member 78 is reversed simultaneously with the direction of rotation of the drum 81. The actuating member 78 is adjustable longitudinally of its shaft, so that it may be disposed in cooperative relation with the selected numeral wheels 75 and for this purpose the gear is provided with a grooved collar which is engaged by a shifting fork 94 which is mediately connected to the carriage 5, so that the member 78 is shifted longitudinally in a direction opposite to that of the direction of movement of the carriage.

In performing problems in division, the direction of rotation of the member 78 and the drum 81 are reversed with respect to the direction of rotation of the actuator and means are provided for effecting this reversal of direction of rotation when the machine is set to perform problems in division. Also, in performing problems in division the actuator rotates in a reverse direction and means are provided for shifting the pin 27 to cause reverse direction of rotation of the actuator when the machine is set for performing problems in division. The means employed for setting the machine to perform problems in division operate to perform both of the above functions, together with other functions which will be described hereinafter.

Arranged at the side of the machine is a setting lever 96 (Fig. 3) which, in its backward position, sets the machine for performing problems in addition, subtraction and multiplication, and which, in its forward position, sets the machine in condition for the automatic performance of problems in division. The lever 96 cooperates with a spring pressed latch plate 97 which serves to hold the lever in adjusted position. Pivoted to the lower end of the lever 96 is a bar 98 which is pivoted at its rearward end to the lever 99 (Fig. 6) by means of the screw 101. The lever 98 and the lever 99 lie on opposite sides of a partitioned wall and the connection screw 101 extends through a slot 102 in the partitioned wall. The lever 99 is journalled on a stud or boss 103 and is provided with a double cam extension or arm 104, the cam 105 serving to control the direction of rotation of the drum 81 and the cam 106 serving to control the operation of the division stop, as will be hereinafter described. The cam portion 105 of the lever arm 104 is operatively associated with the projecting end of the rod 88 (Fig. 10) and serves to control the longitudinal movement of the rod 88 and consequently the position of the transverse pin 87. In Figure 10, the parts are shown in the position to set the machine to perform problems in division, the cam portion 105 being operative to hold the rod 88 depressed. Projecting laterally from the bar 98 is a stud 108 (Fig. 3) which lies in front of the vertical leg 109 (Fig. 8) of the link 55 so that when the lever 96 is moved to its forward or "division" position, the stud 108 is moved backwards moving the link 55 backward and moving the cam 57 to shift the shaft 43 (Fig. 1) which causes the fork 42 to position the pin 27 (Fig. 10) to cause reverse rotation of the actuator. Therefore, shifting the lever 96 to its "division" position positions the main driving reverse gear to cause reverse rotation of the actuator and positions the reverse gear of the drum 81 so that the drum rotates in the opposite direction with respect to the direction of rotation of the actuator.

In machines of this character, when used in the performance of problems in division, the numeral wheels of the product register to the left of the wheels being operated upon by the actuator, change sign when an endeavor is made to divide the divisor into the dividend a greater whole number of times than is possible. Under such conditions, the numeral wheels registration changes from a positive to a negative registration or from a negative to a positive registration and this change, or overdraft registration, has been heretofore utilized to throw into operation mechanism for stopping the machine. Division is accomplished by a reverse rotation of the actuator and, when a condition of overdraft registration existed and the machine had been brought to a stop, the positive operation key was then depressed to cause rotation of the actuator in a forward direction for one revolution to correct the overdraft registration. This correction of the overdraft registration by operation of the positive operation key produced the proper number in the product register and the proper indication in the quotient register. In the present construction, the overdraft registration is utilized to effect the automatic reversal of the direction of rotation of the actuator, without stopping the actuator so that the actuator is then given a forward or additive rotation and is then brought to a stop at the end of the first cycle of forward rotation. This means, however, is disabled when the machine is set to perform problems in addition, multiplication and subtraction and is brought into operation only when the machine is set to perform problems in division. Therefore, this automatic reversal means does not function on the event of an overdraft registration during multiplication, which, if not observed would result in the introduction of errors into the calculation. The shifting of the setting lever 96 to "division" position also serves to enable the automatically operating means for reversing the direction of rotation of the actuator in the event of an overdraft registration and to stop the actuator at the end of its first cycle of forward rotation. Therefore, in performing problems in division, the operator merely depresses the negative operation key 51 and the actuator rotates in a reverse direction until there is an overdraft registration and then the actuator is automatically reversed and stopped at the end of the first cycle of forward rotation. The carriage is then shifted to the next position and the division operation continued until the actuator is again brought to a stop by virtue of an overdraft registration, after which the carriage is again shifted and the operation is repeated until there is no remainder left in the product register or until the product register carriage reaches the end of its movement toward the left. Heretofore, the movement of the carriage has been effected both by hand and by mechanism which is thrown into operation during the corrective or additive rotation of the actuator and, after the shifting of the carriage, the machine was brought to rest so that a further operation of the negative operation key was necessary to perform the next divisional operation step. In accordance with the present invention, the actuator is again started in rotation in a subtractive direction, as soon as the carriage has been shifted so that the operation of division which would result in a quotient containing a plurality of figures is automatically accomplished by the single depression of the negative operation key.

Means are provided which are operative during the reverse or corrective rotation of the actuator, when the machine is set for performing problems in division, for reversing or changing to an additive rotation, the rotation of the actuator when an overdraft registration occurs, which overdraft is usually indicated by a change of sign of the numeral wheel of the next to the highest order within the range of the actuator. This change of sign in a division operation is from zero to nine. On this change of sign, the toothed element 7 (Fig. 14) moves the transfer lever 6 backward. Pivoted on the stud 115 (Fig. 16) is a lever 116 having a transversely extending arm 117 which lies behind and in contact with the rear face of the transfer lever 6 at the left of the series being operated on. The arm 117 is held in engagement with the transfer lever by the spring 118, so that when the transfer lever 6 is rocked backwardly at the time of an overdraft registration or transitional carry, the lever 116 is rocked on its pivot. Secured to the lever 116 is a laterally shiftable arm 119 which is preferably provided with a slot 121 for receiving a laterally shifting member. This member is shifted to either of two positions, by the setting of the machine to perform the desired problem and in Figure 16, the arm 119 is shown in its "division" position.

The arm 119 is shifted sidewise into and out of operative engagement with the reversing and stopping mechanism by means of the bar 123 (Fig. 10). This bar has a turned-down end which is disposed in the slot 121 in the arm 119, and, at its other end is in cooperative relation with the cam section 106 on the lever arm 104. The bar 123 is provided on its end with a slot which engages the cam 106, so that as the lever arm 104 is rocked, the bar 123 is shifted laterally. In Figure 10 the bar 123 is in the position to set the machine in condition to perform problems in division. When the machine is set to perform problems in multiplication, the bar 123 is moved to the left by the cam member 106. The bar 123 has a rather tortuous shape in the present machine, due to the necessity of avoiding the other instrumentalities in the machine, but the shape of the bar does not otherwise enter into its construction or function.

Pivoted to the stud 115 (Fig. 16) is a lever 125 to which is pivoted the substantially vertical link 126 (Fig. 10 and Fig. 14) which at its lower end bears against the arm of the bell crank lever 127. The bell crank lever is pivoted on the bracket 128 and the vertical arm 129 of the lever is forked and engages the collar 131 secured to the rod 28. The horizontal arm 127 of the bell crank lever is thus held elevated by the spring 41 associated with the rod 28 (Fig. 10). The lever 125 to which the bell crank lever is connected by means of the link 126 is therefore normally held in its elevated position.

Means are provided for quickly depressing the lever 125 at the proper time in the operation of the machine, to shift the rod 28 to the left thus shifting the pin 27 and causing the reversal of rotation of the actuator. Mounted in the upper end of the lever 125 is a spring restrained pin 134 which is normally in depressed position. This pin lies adjacent a cam 135 secured to the actuator shaft and, when the pin is projected, it lies in the path of the cam and is struck by the cam just before the actuator reaches full cycle position. When the cam strikes the projected pin, the lever 125 is rocked in a counterclockwise direction depressing the link 126 and thus moving the rod 28 to the right (Fig. 10) shifting the reversing gear. During the operation of division, the actuator rotates in a reverse or counterclockwise direction and the cam 135 is so positioned that it operates to shift the rod 28 when the actuator is in full cycle position, thereby permitting the shifting of the pin 27 from engagement with the gear 24 into engagement with the gear 25 without stopping the operation of the machine.

Pivoted on the lever 125 is a pin operating lever 137 which rocks in a plane at right angles to the plane of movement of the lever 125. The lever 137, at its upper end, engages in a groove in the pin 134 and at its lower end is provided with a foot 138 which lies below the plane of the rear end of the arm 119. When the machine is set for performing problems in addition, subtraction and multiplication, the arm 119 is rocked to one side, so that it does not overlie the foot 138, but when the machine is set for performing problems in division, the arm 119 is moved to the position shown in Figure 10, where it overlies the foot 138. Consequently, upon the occasion of an overdraft registration or transitional carry, the lever 116 is rocked, depressing the arm 119 consequently rocking the lever 137 to project the pin 134 into the path of the cam 135. At full cycle position, the cam 135 strikes the pin 134, rocks the lever 125 and shifts the pin 27 of the reverse gear, to reverse the direction of rotation of the actuator. This is accomplished without disengaging the clutch.

Means are also provided for disengaging the clutch and stopping the actuator at the end of the first cycle of reverse or additive rotation. Pivoted on the shaft 141 (Fig. 14) is a lever 142 having an arm 143 which underlies the horizontal arm of the bell crank lever 127. Therefore, when the horizontal arm of the bell crank lever is rocked by the cam 135, the lever 142 is rocked in a counterclockwise direction. The arm 142 of the lever which is raised when the lever is rocked underlies the end of the lever 145 which is pivoted intermediate its end and which is connected at its other end by the pin 146 (Fig. 10) with the lever 147 which is provided on its end with a tongue 148 which is disposed in the aperture 149 formed in the clutch control bar 71. The levers 145 and 147 are so arranged, that downward movement on the horizontal arm of the bell crank lever 127 causes upward movement of the tongue 148, which kicks the clutch control bar 71 upward, removing it from engagement with the pin 73 and permitting the clutch control lever 18 to spring into engagement with the clutch housing. The operation of the release of the clutch control lever 18, by virtue of the overdraft registration is so timed that the aperture 16 in the clutch housing has moved past the end 19 of the clutch control lever before such lever comes into contact with the clutch housing so that the clutch housing makes one complete revolution after the operation of the automatically operated reverse mechanism. At the end of this one rotation, the foot 19 on the end of the clutch lever 18, engages in the aperture 16 and disengages the clutch and locks the clutch housing against rotation. It is seen therefore, that as a result of the overdraft registration, that the direction of rotation of the actuator is reversed without causing disengagement of the clutch and that the rotation of the actuator is stopped at the end of the first cycle of corrective rotation. This single cycle of corrective or additive rotation, corrects the error in the quotient register and in the product register, caused by the over-registration which resulted in the transitional carry.

Means are provided for locking the positive operation key against movement when the machine is set to perform problems in division, so that the positive operation key may not be inadvertently operated, which would result in the introduction of error into the machine. Means are also provided, when the machine is set to perform problems in division for holding the negative operation key in depressed position, until the problem is completed, thereby eliminating the fatigue of the operator which is caused by the continuous holding down of the negative operation key. It has been shown that positioning of the setting lever 96 in "division" position moves the bar 55 backward, thereby rocking the lever 52 (Fig. 8), the horizontal arm of which underlies the pin 54 on the stem of the negative operation key. Disposed within the machine in correlation with the horizontal arm of the lever 52 and the roller 66 on the frame 67 of the positive operation key 61 is a lever 152, one end of which lies under the horizontal arm of the lever 52 and the other end of which lies under the roller 66. When the lever 52 is rocked by the setting lever 96, the lever 152 is rocked to bring it into engagement with the roller 66. Since the lever 52 is locked in rocked position by the lever 96, the lever 152 then serves to lock the frame 67 against movement, so that the key 61 may not be depressed. When the lever 52 is rocked by the lever 96, the negative operation key 51 is held in its elevated position by the spring 153.

Means are provided for locking the negative operation key 51 in depressed position and for releasing the key upon the completion of the problem in division. The solution of the problem in division involves successive operations of the actuator and successive shiftings of the carriage and the negative operation key is held depressed until the carriage reaches its extreme position of movement which position is determined by the capacity of the machine. The stem of the negative operation key 51 is provided adjacent its lower end with a notch 231 which is engaged by the spring pressed latch 232, when the key is depressed, to hold the key in depressed position. Means are provided for holding the latch in inoperative position, when the machine is set to perform problems in addition, multiplication and subtraction, and for releasing the latch to operative position when the machine is set to perform problems in division. This means, which also serves, when the machine is set to perform problems in division, to move the latch to release the negative operation key 51 when the problem in division has been completed, after the carriage has reached its limit position at the left of the machine, will be described in full hereafter.

Figure 11:
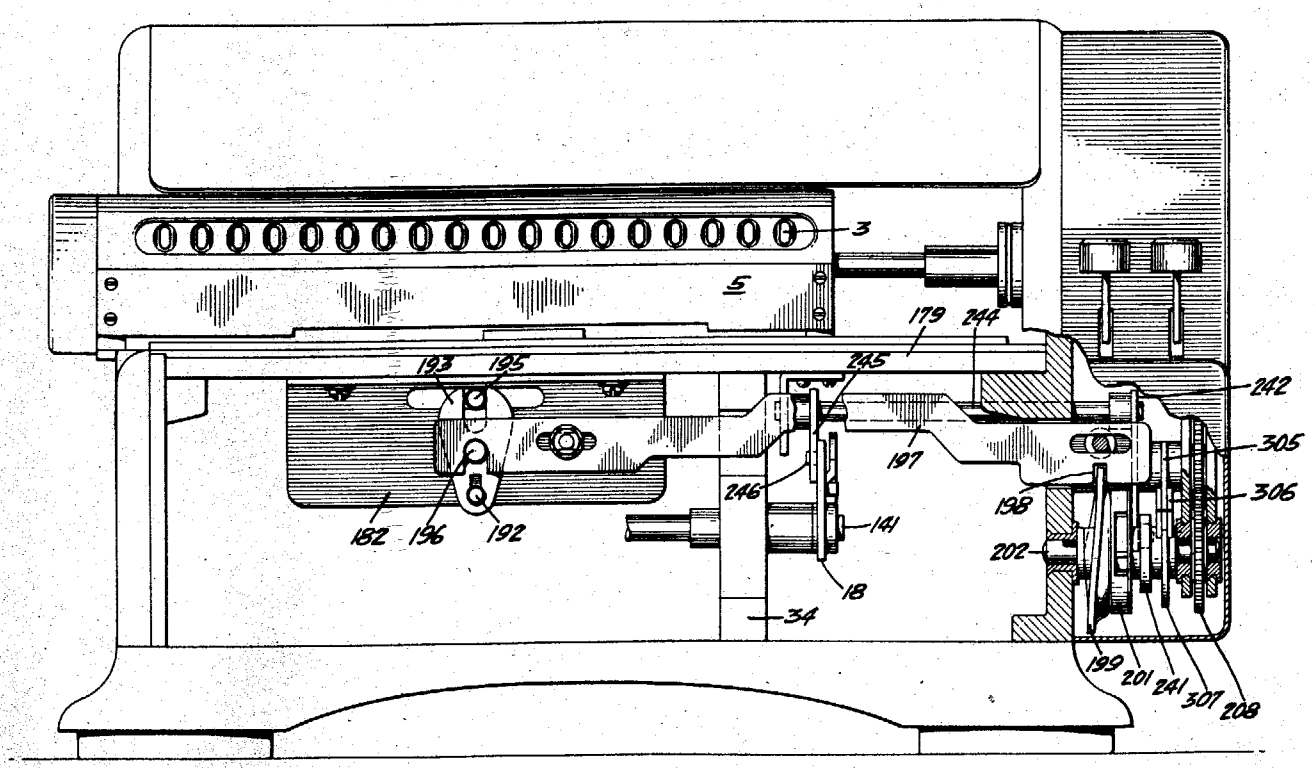
Figure 11 is a vertical transverse section through the calculating machine, showing the carriage shifting mechanism and the control mechanism therefor.

The present machine also embodies means for automatically shifting the carriage after the ordinal registration operation and tens carrying operation has been completed in the corrective forward rotation of the actuator, when performing problems in division. The carriage is slidable transversely in the trackway 179 to which is secured the casing 182, within which is arranged the carriage shifting device. The carriage shifting mechanism employed is fully illustrated and described in my copending application Serial Number 539,422 filed February 27, 1922 and issued as Patent No. 2,028,540, on January 21, 1936, to which reference is hereby made for a complete disclosure of one form of carriage shifting means. These means comprise a slide having a stud 195 (Fig. 11) which is engaged by the slotted shifting arm 193, which is secured to the rod 192, journalled in the frame 182 and extending to the front of the casing of the machine where it is provided with a lever or wheel whereby the rod 192 may be rocked in either direction to shift the carriage one step at a time in such direction. The present invention embodies power driven means which are automatically brought into operation at the end of the correcting cycle of rotation of the actuator, to shift the carriage one step to the left, as shown in Figure 11.

Extending from the arm 193, above the rod 192, is a stud 196 which is engaged by the reciprocable link 197 which extends transversely of the machine. The link 197 is provided on its end remote from the shifting arm 193 with a notch 198, in which is disposed the periphery of the circular cam 199. The cam is so shaped that one rotation thereof will cause reciprocation of the link 197, thereby rocking the arm 193 and shifting the carriage 5 one step to the left. Secured to the cam 199 is a clutch housing 201, which is rotatably mounted on the shaft 202, which is driven by the motor. Secured to the main driving shaft 9 is a gear 203 which drives the shaft 204 through the gears 205 and 206. Secured to the shaft 204 is another gear 207 which drives the gear 208 secured to the shaft 202, through the idler gear 209. The shaft 202 is, therefore, driven when the motor is in operation. Secured to the shaft 202 is a clutch ratchet 212 which is adapted to be engaged by the clutch dog 213 (Fig. 7), which is pivoted to the clutch housing. The mode of operation of this clutch is identical with that of the clutch 13, and the position of the clutch dog 213 which controls the engagement and disengagement of the clutch is controlled by the clutch lever 214 which normally extends through an aperture in the periphery of the clutch housing 201 to engage the clutch dog 213 and hold the clutch disengaged. The cam 199 (Fig. 6) is normally held in full cycle position by the clutch lever 214 and when in such position a notch 215 in the cam lies in the plane of the link 197, so that the link may be moved transversely by hand when the carriage is shifted by operation of the manual shifting key.

Means are provided for controlling the operation of the clutch lever 214 to control the action of the clutch, and these controlling means are automatic and are preferably actuated upon the reverse or additive rotation of the actuator. The clutch control lever 214 is secured to the shaft 216 to which is also secured an arm 217 (Fig. 3) which is normally held in position by the spring 218. In order not to confuse the drawing only a portion of the spring 218 is shown, but it is understood that it extends to the left and is secured at its other end to the frame of the machine. This spring holds the clutch control lever 214 in normal clutch disengaging position as shown in Figure 6.

Means are provided for rocking the shaft 216 to cause engagement of the clutch and subsequent disengagement thereof at the end of one rotation by the reverse or additive rotation of the actuator. In performing problems in division, the multiplier register drum 81 (Fig. 3) rotates initially in a clockwise direction, while the actuator is rotating in a subtractive direction. Upon the reversal of the direction of rotation of the actuator, the direction of rotation of the drum 81 is reversed so that it now rotates in a counterclockwise direction. Secured to the drum 81 is a pin 221 and disposed between the path of the pin and the stud 222 on the end of the arm 217 is a slide 223 which is normally held in retracted position by the spring 224. The upper end of the slide 223 is bevelled at 225 and the position of the slide, due to the action of the spring 224, is such that on subtractive or clockwise rotation of the drum 81 the pin 221 contacts with the bevelled end 225 and moves past the slide, the slide rocking on its pivot 226 to permit this action to occur. The slide is prevented from rocking in the opposite direction by contact thereof with the shaft 204. Rotation of the drum 81 in a reverse or counterclockwise direction, as shown in Figure 3, brings the pin 221 into engagement with the flat end face 227 of the slide 223, forcing this slide downwardly against the pin 222 and rocking the lever 217 and consequently the clutch control lever 214 to disengage the clutch.

In Fig. 3 the drum 81 is shown in full cycle position. Due to the provision of sufficient backlash in the gears 85 and 86, the momentum of the rotating drum carries it past full cycle position, when the clutch housing 13 is stopped, and the movement past full cycle position is sufficient to oscillate the slide 223 to release the clutch 201. The spring 224 returns the drum 81 to full cycle position, and the spring 218 returns the lever 214 into contact with the periphery of the drum 201, so that at the end of the cycle of rotation of the clutch housing 201 the lever 214 drops into the aperture in the periphery thereof, disengages the clutch and stops the clutch housing. The pin 221 strikes the slide 223 after the ordinal registration and tens carrying registration has been completed so that the carriage is free to be shifted transversely. Thus, when the machine is set to perform problems in division, the initial cycle of additive rotation of the actuator not only operates to stop the rotation of the actuator at the end of the cycle, but also operates to shift the carriage to its next position.

The invention contemplates the provision of means for disabling the automatic carriage shifting means, when the machine is employed in performing problems in addition, subtraction and multiplication. Projecting from the bar 98 (Fig. 3) adjacent its rear end is a finger 229 which lies in a plane at one side of the slide 223. Projecting from the side of the slide 223 is a pin 234 under which is disposed a saddle 235, which is movable upwardly and whose function will hereinafter be described. The finger 229 lies in the plane of the saddle and when the lever 96 is moved to its multiplication position, the finger contacts with and raises the saddle 235, thus rocking the slide 223 on its pivot to move the lower end thereof upward so that the pin 222 on the lever 217 does not now lie in the path of movement of the slide. Therefore, upon additive rotation of the drum 81 the slide is reciprocated, but since the pin 222 lies out of the path of the slide the reciprocation of the slide is ineffective in so far as shifting of the carriage is concerned.

It has been shown that when the machine is set to perform problems in division that the main driving clutch is disengaged and the clutch housing 13 brought to a stop at the end of the first cycle of corrective or additive rotation of the actuator. The clutch is disengaged and stopped by the release of the clutch lever 18, and during the time that the main clutch is stopped the carriage is shifted to the next position. The invention contemplates means for automatically reengaging the main clutch and releasing the clutch housing 13, after the carriage has shifted, to continue the divisional operation in the next numerical position. This is accomplished by means of a cam 241 secured to the carriage shifting clutch housing 201. Cooperating with the cam 241 is a lever 242 carrying on its end a roller 243, which engages the cam. The lever 242 is secured to a rock shaft 244, which is journalled in the frame of the machine, and secured to the other end of the shaft 244 is a finger 245 which engages underneath the pin 246 projecting from the clutch control lever 18. The cam 241 is positioned so that it rocks the shaft 244, as the housing 201 reaches the end of its cycle of rotation. The rocking of the shaft 244 by the cam 241 moves the finger 245 (Fig. 2) in a clockwise direction, thereby rocking the clutch lever 18 to cause engagement of the main clutch and the release of the clutch housing 13 so that the driving connection is again established between the motor and the actuator. The clutch control bar 71 is held in clutch disengaging position by the latch 232 which holds the negative operation key 51 depressed and, when the clutch control lever 18 is rocked by the arm 245 the pin 73 on the clutch control lever engages in the notch 72 in the end of the clutch control bar 71, so that the clutch control lever is held out of engagement with the clutch housing 13. On the occasion of an overdraft registration the clutch control bar 71 is again kicked upward, as hereinafore described, releasing the clutch control lever 18. The cam 241 is of short circumferential dimension so that after the arm 245 is moved to cause the release of the clutch housing 13 the arm 245 moves back to inoperative position so that it will not interfere with the subsequent movement of the clutch control lever 18 to clutch disengaging position, upon the corrective or additive rotation of the actuator, following an overdraft registration.

Figure 12:
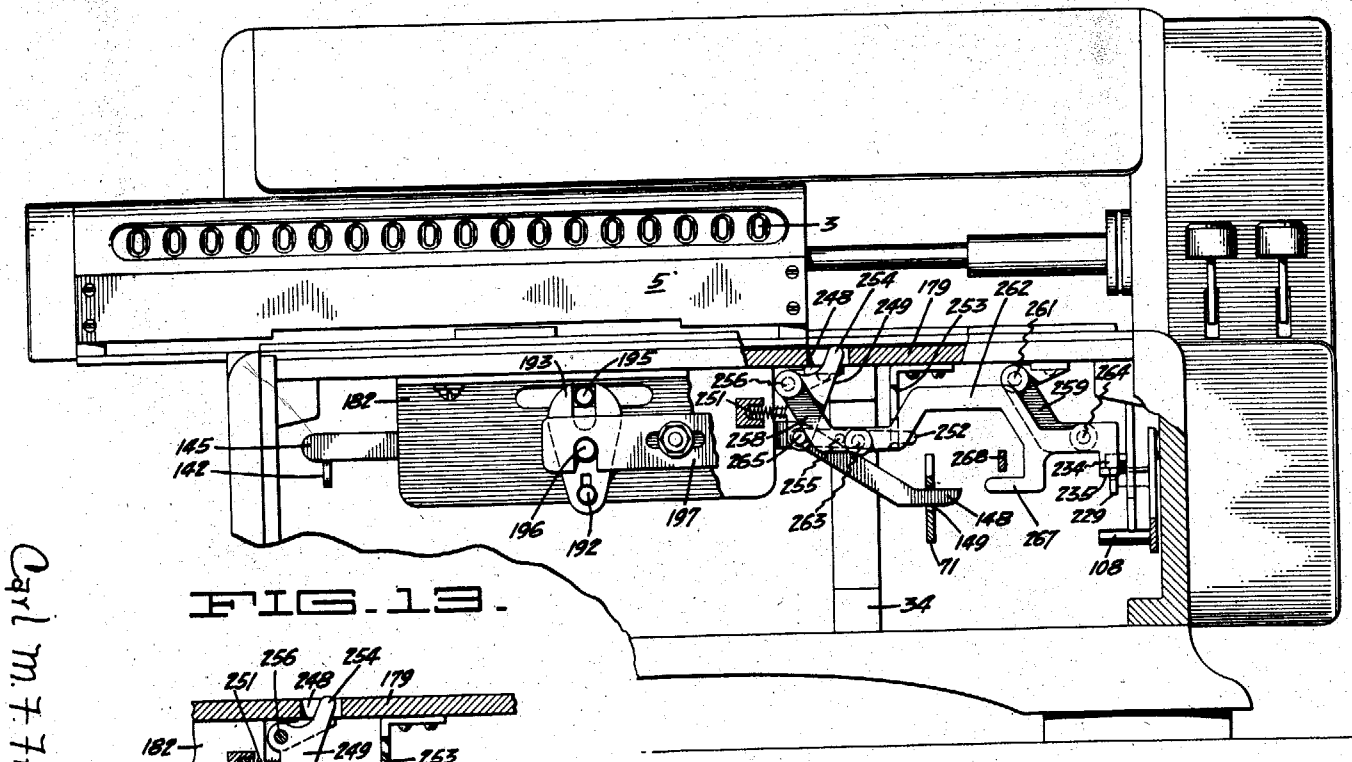
Figure 12 is a vertical, transverse section through the calculating machine, showing the control mechanism which is operative to stop the machine after the carriage has reached its extreme left hand position.
Figure 13:
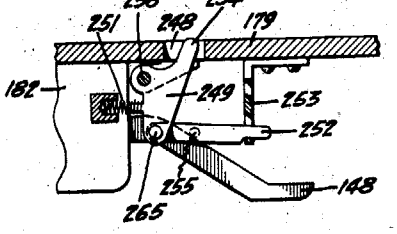
Figure 13 is a detail showing the means for releasing the mechanism which controls the stopping of the machine, after the carriage has reached its extreme left hand position.

Means are provided for terminating the operation of the machine, when it is set to perform problems in division, when the carriage has reached its furthermost position at the left. The carriage trackway 179 is provided with an aperture 248, which is normally covered by the carriage and which is uncovered when the carriage reaches its furthest position in its movement toward the left. Pivoted to a bracket arranged below the trackway 179 is a trigger 249, which is normally held in restrained position against the action of the spring 251 by a latch 252, which is normally in engagement with the bracket 253. The trigger 249 is provided with a finger 254 which projects into the aperture 248 and which is normally held from moving upward by the base of the carriage 5, which normally overlies the aperture. When the carriage moves to its left position, as shown in Figure 12, the trigger when released by the latch may move to project the finger 254 above the plane of the trackway 179. The latch 252 is provided on its side with a pin 255 which overlies the automatic clutch tripping lever 148 and, when this lever is operated to trip the clutch, the latch 252 is raised from engagement with the bracket 253. When, however, the aperture 248 is covered by the carriage, the trigger 249 can not swing about its pivot 256 and consequently the latch 252 drops back into engagement with the bracket 253. When, however, the aperture 248 is uncovered, the release of the latch 252 permits the spring 251 to rock the trigger 249 about its pivot 256, and this occurs during the corrective or additive rotation of the actuator, after the carriage has reached its limit position to the left. In this position, the capacity of the machine has been reached, and means are provided which are thrown into operation by the movement of the trigger 249 for bringing the machine to a stop. Fulcrumed on the pivot 256 of the latch 249 is an inclined lever 258, which in combination with the similar lever 259 pivoted on the bracket 261 forms a pair of parallel levers. The other ends of the levers are pivoted to a swing member 262 by the pins 263 and 264. The latch 249 carries at its lower end a pin 265, which lies in contact with the inclined face of the lever 258, and when the latch 249 is released and is moved by the spring 251 in a counterclockwise direction the pin 265 swings the swing member 262 (Fig. 12) upward and to the right. The swing member 262 is provided with a foot 267, which underlies the finger 268 which comprises an extension of the latch 232 and, when the swing member 252 is swung by the trigger 249, the finger 268 is lifted, causing the latch 232 to disengage the negative operation key 51. The upward movement of the key 51 permits the spring to draw the clutch control bar 71 backward, out of cooperative relation with the pin 73 on the clutch control lever, so that the clutch remains locked and the machine is brought to a stop.

The saddle 235 (Fig. 3), which underlies the pin 234, is formed on the end of the swing member 262 (Fig. 12), so that as the swing member is moved upward the saddle 235 is lifted, swinging the control bar 223, so that its lower end is moved out of the path of the pin 222 so that the carriage shifting mechanism is not thrown into operation. Therefore, the machine is brought to a stop after the corrective or additive rotation of the actuator, when the carriage is in its limit position to the left. Since this stopping mechanism is effective only when the machine is set to perform problems in division, it is inoperative when the carriage is in its limit position to the left when the machine is set to perform problems in multiplication, addition, and subtraction.

Figure 18:
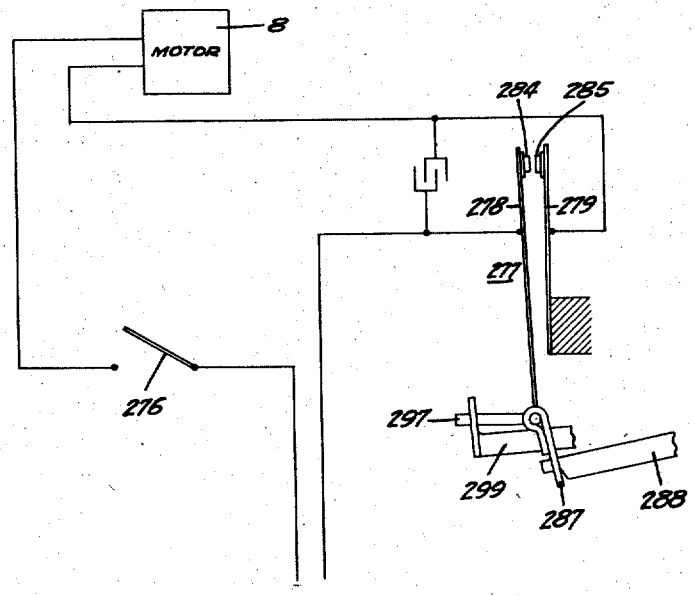
Figure 18 is a diagrammatic representation of the motor circuit.

The present machine is driven by a normally silent motor 8, the control switch in the motor circuit being normally open. The switch is closed by the depression of any of the operating keys and remains closed only during such time that the mechanism of the calculating machine is in operation to perform a calculation, to shift the carriage or to reset the registers of the calculating machine to zero. When the machine is set to perform problems in division, the motor switch is closed by the depression of the negative operation key 51 and is controlled as herein described so as to maintain the motor in continuous operation until the depressed negative operation key is released by the tripping of the latch 232. The motor circuit is provided with a switch 276 (Fig. 18), which is closed by hand by the operator when he desires to use the calculating machine. This switch, however, does not close the motor circuit because such circuit is provided with another switch which must be closed before the circuit through the motor is closed. The second switch is arranged to be closed upon depression of any of the control keys, and, since all of these keys are associated with the clutch control lever 18, the operating mechanism for the second switch is preferably associated with said lever 18, so that upon depression of any of the control keys the control switch is closed. In the present construction, the control switch 277 (Fig. 2) comprises two metallic elements 278 and 279 spaced apart at their lower ends by suitable insulating material 281, and suitably bound together by screws 282 which do not, however, contact with the metallic elements 278 and 279. The block of insulating material 281 in which the elements 278 and 279 are held is mounted on a shaft 283, which is suitably journalled in the frame of the machine, so that the insulating block 281 and the resilient metallic contact may be slightly rotated. The metallic elements 278 and 279 are provided at their upper ends with normally spaced contacts 284 and 285, and the metallic element 279 is in contact with an insulating stud 286. A slight rotation of the shaft 283 in a clockwise direction (Fig. 2) causes the flexing of the metallic element 279, due to its contact with the stud 286, bringing the two contact members 284 and 285 together and closing the circuit through the motor. The member 279 possesses sufficient resiliency to return the insulating block 281 to the position shown in Figure 2 upon the release of the pressure tending to rotate the shaft 283 so that a torsional strain is required to rotate the shaft 283 to bring the contact 284 and the contact 285 together, and when such torsional pressure is released the switch opens. Secured to the shaft 283 is an arm 287 having a slot therein, in which is disposed the shouldered end of the link 288 which, at its forward end, is pivoted to the lever 289. The lever 289 is provided at its upper end with a lateral extension 289ª, which lies behind the clutch control lever 18. Interposed between the clutch control lever and the extension 289ª (Figs. 4 and 5) is a lever 290, which is normally in close contact at its upper end with the extension 289ª and the rear end of the lever 18. Therefore, movement of the clutch control 18 in a direction to release the clutch housing and cause engagement of the clutch rocks the lever 289 backwardly, thus rocking the shaft 283 and bringing the contact 284 and the contact 285 into engagement, closing the circuit through the motor. As long as any of the control keys is held depressed, the clutch lever 18 is held in the position shown in Figure 4, holding the extension 289ª pressed backward and holding the switch closed. In the operation of the machine, however, when it is set to perform problems in addition, multiplication and subtraction, either key 51 or 61 is frequently given an abrupt tap and is not held depressed, and means are provided for preventing the immediate reopening of the switch when this practice is employed. It will be noted in Figure 4 that there is a material clearance between the end of the foot 19 on the lever 18 and the periphery of the clutch housing 13, and when pressure on the key is released the foot 19 moves forward and rides on the periphery of the clutch housing, as shown in Figure 5. This forward movement of the foot 19 and the consequent forward movement of the lever 290 would permit, if not prevented, a forward movement of the lever 289 which might be sufficient, either due to wear or the lack of close adjustment, to open the motor circuit and cause the machine to stop with the actuator out of full cycle position or in mid cycle position. To overcome this possibility, I have associated the lever 289 with the full cycle stop means, so that the switch is always held closed during the time that the calculating mechanism is out of full cycle position. Associated with the clutch housing 13 is a full cycle stop means or centralizing lever 292, which is provided on its end with a cam projection 293 which normally seats in a cam notch 294 in the side wall of the clutch housing to position and hold the housing and consequently the actuator in full cycle position. The cam projection 293 is pressed into the notch 294 or against the periphery of the housing by the strong spring 295, which is of sufficient strength to position the housing in full cycle position. Upon the initial movement of the clutch housing from full cycle position, the centralizing lever is moved counterclockwise bringing the upper end thereof into contact with the backwardly pressed arm 289ª of the lever 289, as shown in Figure 5, and holding such lever in switch closing position until the clutch housing again reaches full cycle position. The arrangement of the switch operating parts is preferably such that the contacts 284 and 285 are brought together starting the motor before the pawl 14 engages the ratchet 12, thereby permitting the motor to gain speed before the load is applied thereto.

Figure 17:
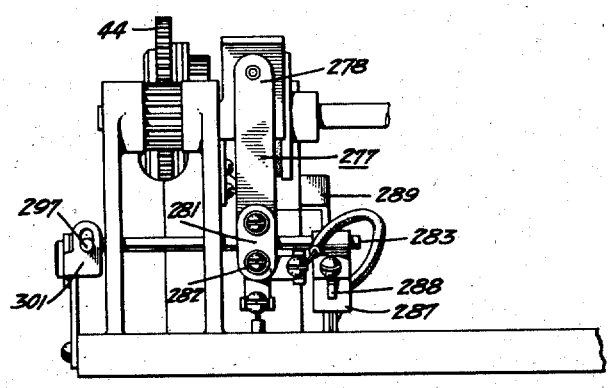
Figure 17 is a rear elevation of the switch in the motor circuit.

When the machine is set to perform problems in division, the main driving clutch is disengaged during the time that the carriage is being shifted, and means are provided for holding closed the control switch 277 during such time. The shaft 283 on which the switch is mounted is provided at its end with a right-angled extension 297 (Fig. 6), which is moved upwardly when the switch is closed. Pivoted on a bracket 298 is a lever 299 having an eye 301 (Fig. 17) at its end, which surrounds the extension 297. The other end of the lever 299 extends forwardly and is provided on its forward end with a foot 302. Disposed in cooperative relation with the foot 302 is an arm 303 which is secured to the rock shaft 304. Secured to the rock shaft 304 is an arm 305, which is provided on its end with a shoe 306 which is in operative engagement with a cam 307 secured to the driven element or housing of clutch 201. The cam 307 is so designed and so placed that it raises the shoe 306 and consequently depresses the foot 302, holding the extension 297 elevated during the time that the clutch 201 is engaged and the centralizing lever 292 is in engagement with the notch 294 in the side wall of the main clutch the coasting of the motor and gear train after the seating of lever 292 in notch 294 being sufficient to advance the driven element of clutch 201 enough to effect reclosure of the switch by means of cam 307. Therefore, during substantially the entire time that the main driving clutch is disengaged and the clutch housing held stationary the motor switch is held closed so that the motor drives the carriage shifting mechanism. Upon the conclusion of the operation of the carriage shifting mechanism, the clutch control lever 18 is again moved to free the clutch housing and, during the time that the clutch control lever is in this position, the switch is held closed by such lever. In this way the motor is maintained in continuous operation even though the switch opens and closes during the transition from actuator operation to carriage shifting. When the machine is brought to a stop after the carriage has reached its limit left hand position, the main driving clutch is disengaged and the carriage shifting control bar 223 is moved to inoperative position, so that the carriage shifting means is not operated. Therefore, the housing 201 is not rotated and consequently the mechanism for holding the switch closed is not operated, so that the switch is opened and the machine brought to a stop.

I have, therefore, provided in a calculating machine means for setting the machine to perform problems in division, which means function to correct the overdraft registrations in the respective numeral orders, to alternately shift the carriage, that is, between divisional operations to the next numeral order, to maintain the electric circuit of the motor closed during the time that the carriage is being shifted, and to bring the mechanism and the motor to a stop when the machine has operated, in a divisional operation, to the extent of its capacity.

I claim:

1. In a motor driven calculating machine, numeral wheels, a transversely displaceable carriage on which said wheels are mounted, a normally open switch in the motor circuit, manually operable means for closing said switch to initiate operation of the motor, means for shifting the carriage to the left actuated in response to the operation of said manually operable means, means operable by the shifting means for controlling said switch so as to cause continued operation of the motor, and means operable upon displacement of the carriage to its extreme left position for rendering said controlling means inoperative.

2. In a motor driven calculating machine, numeral wheels, a reversible rotary actuator therefor, a transversely displaceable carriage on which said wheels are mounted, a normally open switch in the motor circuit, a normally open clutch between the motor and the actuator, manually operable means for closing said clutch and closing said switch to initiate operation of the motor, means controlled by said clutch during closure thereof for holding said switch closed, automatically operated means controlled by said numeral wheels for periodically opening and closing said clutch, means operative during the time of open clutch for displacing the carriage, and means operated by the carriage displacing means for controlling said switch so as to prevent interruption of the operation of the motor during the time of open clutch.

3. In a motor driven calculating machine, numeral wheels, a reversible rotary actuator therefor, a transversely displaceable carriage on which said wheels are mounted, a normally open switch in the motor circuit, a normally open clutch between the motor and the actuator, manually operable means for closing said clutch and closing said switch to initiate operation of the motor, means controlled by said clutch during closure thereof for holding said switch closed, automatically operated means controlled by said numeral wheels for periodically opening and closing said clutch, means operative during the time of open clutch for displacing the carriage, means operated during the time of open clutch for controlling said switch so as to prevent interruption of the operation of the motor, and means controlled by the carriage for controlling said switch-controlling means.

4. In a motor driven calculating machine, numeral wheels, a reversible rotary actuator therefor, a transversely displaceable carriage on which said wheels are mounted, a clutch between the motor and the actuator, a lever normally holding said clutch open, depressible means operative to move said lever to close the clutch, automatically operated means controlled by said numeral wheels for disengaging said lever from said depressed means to open the clutch, means for shifting the carriage during the time of open clutch, means actuated by the carriage shifting means for re-engaging said lever with said depressed means, and means brought into operation when the carriage has reached its extreme left position for rendering said carriage shifting means inoperative.

5. In a motor driven calculating machine, numeral wheels, a transversely displaceable carriage upon which said numeral wheels are mounted, reversible rotary actuating mechanism for said wheels, clutching and reversing power transmission for reversibly connecting the said actuating mechanism to said motor, means comprising an independently operable power transmission mechanism for connecting said carriage to said motor for transverse displacement thereby, means deriving power from said motor for bringing said independently operable power transmission mechanism into operation to transmit power from said motor to said carriage, comprising an element and operating mechanism therefor including means controlled by said actuating mechanism and effective during a stopping operation thereof for moving said element in one manner as an incident to the stopping of the actuating mechanism after operation thereof in one direction and in another manner as an incident to the stopping of the actuating mechanism after operation thereof in the opposite direction, one of said movements of said element being effective and the other ineffective to bring said independently operable power transmission into operation, and means responsive to the operation of said carriage displacing transmission mechanism for reconnecting the actuating mechanism to the motor.

6. In a motor driven calculating machine, numeral wheels, a transversely displaceable carriage upon which said numeral wheels are mounted, reversible rotary actuating mechanism for said wheels, clutching and reversing power transmission for reversibly connecting the said actuating mechanism to said motor, means comprising an independently operable power transmission mechanism for connecting said carriage to said motor for transverse displacement thereby, means deriving power from said motor for bringing said independently operable power transmission mechanism into operation to transmit power from said motor to said carriage, comprising an element and operating mechanism therefor, said element being supported for pivotal movement and said operating mechanism being controlled by said actuating mechanism and including means effective during the stopping operation for rocking said element about its pivot axis as an incident to the stopping of the actuating mechanism after operation thereof in one direction and said element being movable in another manner as an incident to the stopping of the actuating mechanism after operation thereof in the opposite direction, said latter movement being effective and said rocking being ineffective to bring said independently operable power transmission into operation, and means responsive to the operation of said carriage displacing transmission mechanism for reconnecting the actuating mechanism to the motor.

7. In a calculating machine having a transversely shiftable carriage, numeral wheels thereon, reversible rotary differential actuators for said wheels, and motor drive means including an actuator driving train, a clutch in said train, a carriage shifting train, and a clutch in said train, control means including devices controlled by said numeral wheels, said control means being operable automatically under the control of said wheels to disengage the actuator clutch, and to prevent reengagement of the actuator clutch; means deriving power from said motor for bringing said carriage shifting train into operation to transmit power from said motor to said carriage, comprising an element and operating mechanism therefor, including means controlled by said differential actuators and effective during the stopping operation thereof for moving said element in one manner as an incident to the stopping of the actuators after operation thereof in one direction and in another manner as an incident to the stopping of the actuators after operation thereof in the opposite direction, one of said movements of said element being effective and the other ineffective to bring said carriage shifting train into operation, means separate from the carriage shifting train for reengaging the actuator clutch, and means responsive to the operation of the carriage shifting train for rendering said reengagement preventing means ineffective.

8. In a calculating machine having a transversely shiftable carriage, numeral wheels thereon, reversible rotary differential actuators for said wheels, and motor drive means including an actuator driving train, a clutch in said train, a carriage shifting train, and a clutch in said train, control means including devices controlled by said numeral wheels, said control means being operable automatically under the control of said wheels to disengage the actuator clutch, and to prevent reengagement of the actuator clutch; means deriving power from said motor for bringing said carriage shifting train into operation to transmit power from said motor to said carriage, comprising an element and operating mechanism therefor, said element being supported for pivotal movement and said operating mechanism controlled by said differential actuators and including means effective during a stopping operation for rocking said element about its pivot axis as an incident to the stopping of the actuators after operation thereof in one direction and movable in another manner as an incident to the stopping of said actuators after operation thereof in the opposite direction, said latter movement being effective, said rocking being ineffective to thus bring said carriage shifting train into operation, and means responsive to the operation of the carriage shifting train for rendering said reengagement preventing means ineffective.

9. In a calculating machine having a transversely shiftable carriage, numeral wheels thereon and differential actuators for said wheels, motor drive means including an actuator driving train having driving and driven members therein adapted to be moved into and out of driving engagement, a carriage shifting train, and a clutch in said train, control means operable automatically to move said members out of driving engagement, to engage the carriage shift clutch, and to restrain movement of said members into driving engagement during a portion at least of the operation of the carriage shifting train; and a spring device separate from the carriage shifting train effective unless restrained during the operation of carriage shifting to move said members into driving engagement.

10. In a calculating machine having a transversely shiftable carriage, numeral wheels thereon and differential actuators for said wheels, motor drive means including an actuator driving train, a clutch in said train, a carriage shifting train, and a clutch in said train, control means including devices controlled by said numeral wheels; said control means being operable automatically under the control of said wheels to disengage the actuator clutch, to engage the carriage shift clutch, and to prevent reengagement of the actuator clutch during a portion at least of the operation of the carriage shifting train; and a spring device separate from the carriage shifting train and effective unless restrained during carriage shifting to reengage the actuator clutch.

11. In a calculating machine having a transversely shiftable carriage, numeral wheels thereon and differential actuators for said wheels, motor drive means including an actuator driving train, a clutch in said train, a carriage shifting train, and a clutch in said train, control means including devices controlled by said numeral wheels; said control means being operable automatically under the control of said wheels to disengage the actuator clutch, to engage the carriage shift clutch, and to prevent reengagement of the actuator clutch during a portion at least of the operation of the carriage shifting train; a spring device separate from the carriage shifting train and effective unless restrained during carriage shifting to reengage the actuator clutch, and a cam driven by the carriage shifting train operative to render the aforesaid control means ineffective to prevent reengagement of the actuator clutch.

12. In a calculating machine having a transversely shiftable carriage, numeral wheels thereon and differential actuators for said wheels, motor drive means including an actuator driving train, a clutch in said train, a carriage shifting train, and a clutch in said train, control means including devices controlled by said numeral wheels; said control means being operable automatically under the control of said wheels to disengage the actuator clutch, to engage the carriage shift clutch, and to prevent reengagement of the actuator clutch, means separate from the carriage shifting train for reengaging the actuator clutch, and means responsive to the operation of the carriage shifting train for rendering said control means ineffective to prevent reengagement of the actuator clutch.

13. In a calculating machine having a transversely shiftable carriage, numeral wheels thereon and differential actuators for said wheels, motor drive means including an actuator driving train, a clutch in said train, a carriage shifting train, and a clutch in said train, control means including devices controlled by said numeral wheels; said control means being operable automatically under the control of said wheels to disengage the actuator clutch, to engage the carriage shift clutch, and to prevent reengagement of the actuator clutch during a portion at least of the operation of the carriage shifting train; spring means separate from the carriage shifting train and tending during carriage shifting to reengage the actuator clutch, and means responsive to the operation of the carriage shifting train for rendering said control means ineffective to prevent reengagement and thereby allowing said spring means to effect reengagement of said actuator clutch.

14. In a calculating machine having a transversely shiftable carriage, numeral wheels thereon and differential actuators for said wheels, motor drive means including an actuator driving train, a clutch in said train, a carriage shifting train, and a clutch in said train, control means including devices controlled by said numeral wheels; said control means being operable automatically under the control of said wheels to disengage the actuator clutch, to engage the carriage shift clutch, and to prevent both reengagement of the actuator clutch and effective movement of said differential actuators, means separate from the carriage shifting train for reengaging the actuator clutch, and means responsive to the operation of the carriage shifting train for rendering said control means ineffective to prevent reengagement of the actuator clutch.

CARL M. F. FRIDEN.